Oct. 12, 1954  R. R. KREISEL ET AL  2,691,297
APPARATUS FOR TESTING LEAKY RECEPTACLES
Filed July 11, 1951  3 Sheets-Sheet 1

INVENTORS R.R.KREISEL
R.E.POLK
BY
ATTORNEY

INVENTORS R. R. KREISEL
R. E. POLK
BY
ATTORNEY

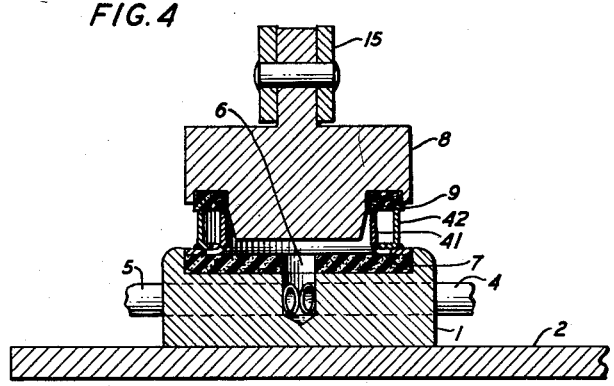
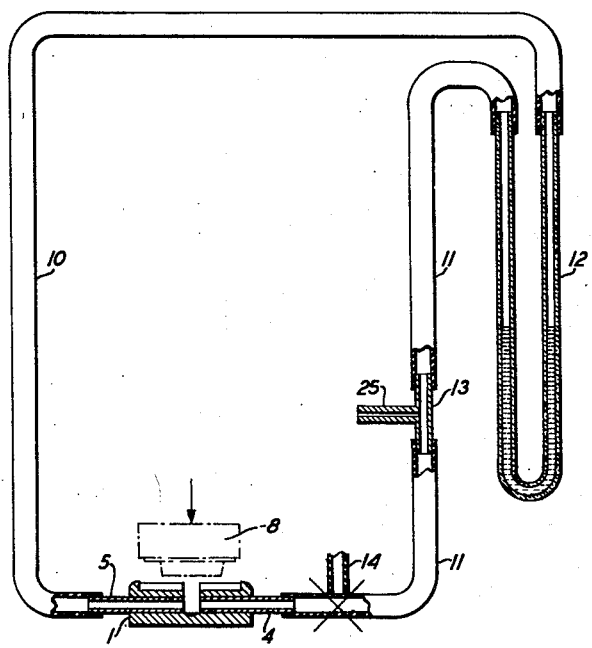
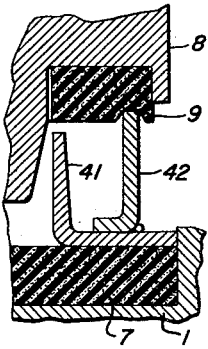

Patented Oct. 12, 1954

2,691,297

UNITED STATES PATENT OFFICE 2,691,297

APPARATUS FOR TESTING LEAKY RECEPTACLES

Ralph R. Kreisel, New Providence, and Robert E. Polk, Summit, N. J., assignors to Bell Telephone Laboratories, Incorporated, New York, N. Y., a corporation of New York Application July 11, 1951, Serial No. 236,222

4 Claims. (Cl. 73—40)

This invention relates to apparatus for testing the leakage of metal receptacles.

The principal object of the invention is an easily operable testing apparatus adapted to produce an increase in pressure in the receptacle under test; and to compare the leakage of the receptacle under test with the leakage through a reference orifice.

A feature of the invention is a coupler having a resilient seat adapted to make a fluid tight connection with the leaky receptacle, a plunger also having a resilient seat adapted to make a fluid tight connection with the receptacle and a lever mechanism adapted to advance the plunger towards the coupler to compress the resilient seats and thus increase the pressure in the receptacle.

Another feature of the invention is the combination of a differential fluid pressure gauge, a first conduit connecting the gauge to the coupler, a second conduit connecting the gauge to the coupler and having a reference leak orifice, and a cut-off cock intercalated in the second conduit between the coupler and the orifice. Preferably, the volumes of the two systems connecting the gauge and the cut-off cock are substantially equal, so that, if the leakage from the receptacle equals the leakage through the reference orifice, the pressures of the fluids in the two volumes will decrease at the same rate, and the gauge will be unaffected by the leaks.

Other objects and advantages of the invention will be apparent from the following description, which, taken in connection with the drawings, discloses a preferred embodiment of the invention.

In the drawings:

Fig. 4 is a sectional view of the plunger and coupler;

Fig. 5 is a simplified schematic showing of the apparatus; and

Fig. 6 is an enlarged sectional view of the plunger and receptacle showing the plunger in its operative position.

Figure 1:
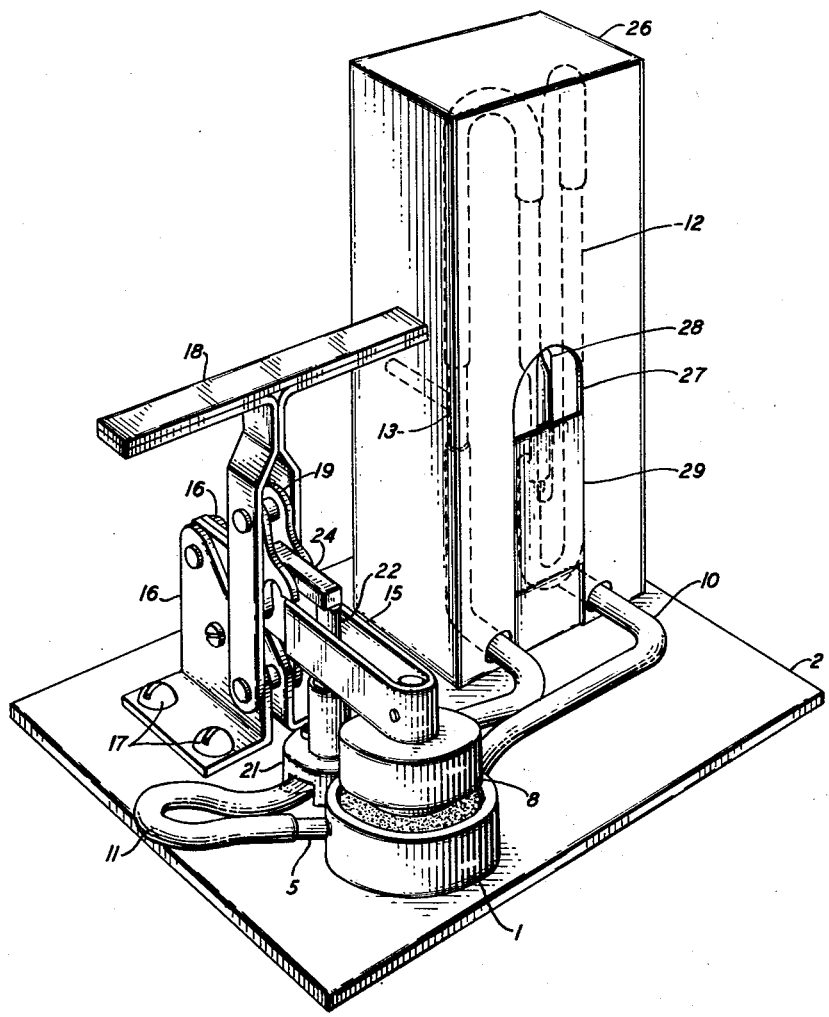
Fig. 1 is a perspective view of a preferred form of apparatus embodying the invention.

The present apparatus is specifically designed for testing the diaphragm seat and pole-piece subassembly of the U-1 telephone receiver, recently introduced into the telephone plant, and described in an article "The ring armature telephone receiver," by E. E. Mott and R. C. Miner, Bell System Technical Journal, volume 30, No. 1, January 1951, pages 110 to 140.

As shown in section in Fig. 4, this subassembly includes the pole-piece 41 having the form of a flanged ring, and the diaphragm seat 42, mounted on the flange of the pole-piece 41, and having the form of a ring with a small flange. The flange of the seat 42 is welded to the flange of the pole-piece 41. As the operating coil of the telephone receiver will be mounted in the annular space between the pole-piece 41 and the seat 42, holes are punched through the flanges of the pole-piece 41 and seat 42 for the leading out wires of this coil, and also for the prongs of the coil stop which will be placed over the coil in order to hold the coil in position. In the design of this telephone receiver, for acoustic reasons, a small hole is punched in the diaphragm of the receiver, to control the passage of air from the front to the rear of the diaphragm. As the holes which are punched in the pole-piece 41 and the seat 42, and any other holes which may be produced between these elements by defective welding, will be in parallel with the hole punched in the diaphragm of the receiver and will thus modify the acoustic effect of this hole, these subassemblies must be tested to insure that the total leak through all the holes in the subassembly is not greater than a permissible value, which may conveniently be determined by the leakage through a reference orifice.

The body 1 of the coupler may conveniently be secured to a suitable base 2 as by screws 3, 3 and is drilled to support two nipples 4, 5 terminating in a central cavity 6. The upper surface of the body 1 is recessed to hold the resilient seat 7, having a central orifice coinciding with the central cavity in the body 1. The subassembly formed of the pole-piece 41 and seat 42 is placed on the resilient seat 7. The body 8 of the plunger is recessed to support the resilient seat 9, and has a central portion projecting into the pole-piece 41. It will be noted that the upper end of the diaphragm seat 42, projects slightly above the upper end of the pole-piece 41. With the subassembly in place on the resilient seat 7, if the plunger 8 is forced downward compressing the resilient seats 7 and 9, the air in front of the body 8 and in the cavity of the body 1 will be compressed, and this compression will also be communicated over the upper edge of the pole-piece 41 to the annular space between the pole-piece 41 and the diaphragm seat 42.

As shown in Fig. 5, the nipple 5 is connected by a suitable conduit 10, such as a piece of rubber tubing, to one input connection of a differential pressure gauge 12, which may conveniently have the form of a liquid manometer. The nipple 4 is similarly connected by conduit 11 to the other input connection of the gauge 12, and intercalated in this conduit is a reference orifice 25. As described hereinafter, a piece of tubing 14 is arranged to pinch the conduit 11 to form a cut-off cock. A subassembly is placed in the base 1, the plunger 8 is forced downward raising the pressure in the system, and when the plunger 8 reaches the end of its travel, the cut-off cock 14 is closed and the compressed air in the conduit 10 and the coupler 1 begins to leak away through the subassembly under test. At the same time, the compressed air in the conduit 11 commences to escape through the reference orifice 25. If the rate of leaking through the subassembly being tested is equal to the rate of leakage through the reference orifice 25, the levels of the liquid in the two arms of the manometer 12 will be the same. However, if the leakage in the subassembly being tested is larger than that of the reference orifice, thus reducing the pressure in the conduit 10, the liquid in the left arm of the manometer 12 will fall, thus indicating a defective device.

Figure 2:
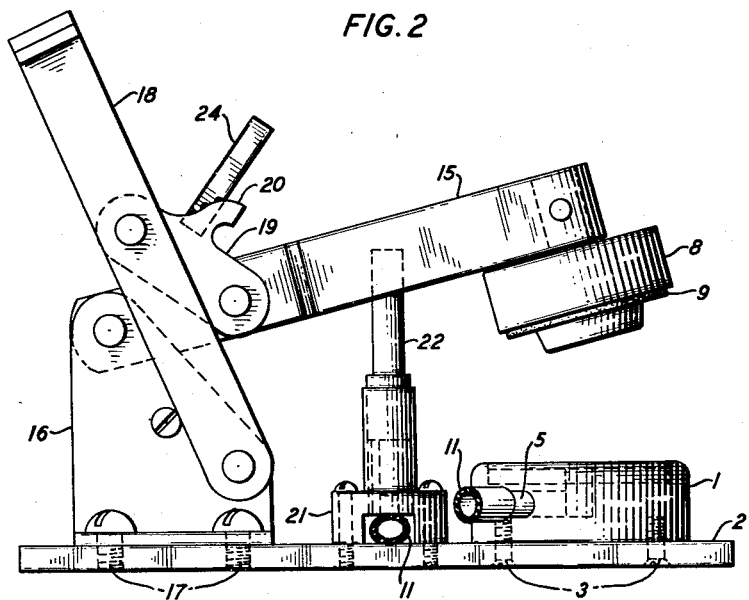
Figs. 2 and 3 are detailed views of the lever mechanism actuating the plunger and cut-off cock.
Figure 3:
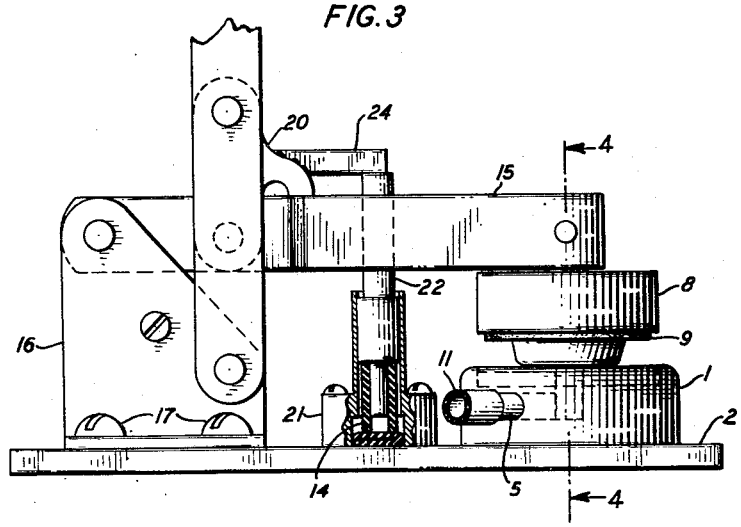

The body 8 of the plunger is riveted, or otherwise secured, to the lever arm 15 which is pivoted to the supports 16, 16 secured to the base 2 by the screws 17, 17. The operating lever 18 is also pivoted to the supports 16, 16. The toggle link 19 is pivoted to the operating lever 18, and also to the lever arm 15. As shown in Fig. 2, when the operating lever 18 is pushed backward, the toggle link 19 wil raise the lever arm 15 and the plunger 8, thus permitting the device to be inserted in the coupler 1. The operating lever 18 is then drawn forward, forcing the lever arm 15 downward to bring the resilient seat 9 of the plunger into contact with the device. Due to the toggle action, as the operating lever 18 approaches the vertical, considerable pressure is exerted on the plunger body 8, forcing the resilient seat 9 firmly into contact with the device being tested. At the end of the movement of the operating lever 18, the projection 20 on the toggle link 19 comes into contact with the lever arm 15, thus increasing the pressure exerted on the coupler body 8.

The conduit 11 is threaded through an opening formed in the body of the cut-off cock 21, which also has an upstanding vertical portion in which the plunger 22 is slidably supported. A shoulder is formed on the lower end of the plunger 22, and a short length of rubber tubing 14 is slipped over the end of the plunger 22 and abuts against this shoulder. A bar 24 is attached to the toggle link 20, and when the operating lever 18 is pulled forward, the bar 24 makes contact with the plunger 22 forcing the piece of rubber tubing 14 downward on the conduit 11, pinching the conduit 11 to cut off the passage of fluid through this conduit.

A single forward movement of the operating lever 18 thus will bring the plunger seat 9 in contact with the device under test, will then exert considerable pressure upon the device to increase the pressure of air in the system, and finally will pinch the conduit 11 to cut off the passage of air through the conduit 11 at the cut-off cock 21 thus dividing the system into two independent systems.

As shown in Fig. 5 the reference orifice 25 may comprise a short length of metallic tubing 13 drilled on one side to permit the insertion of the element 25, which may be brazed, or otherwise attached, to the tube 13. A small hole is drilled in the element 25 to form the reference orifice.

The differential pressure gauge may conveniently be in the form of a manometer, having a U-shaped tube partially filled with some convenient liquid, such as colored water or alcohol, or mercury. As shown in Fig. 1, the manometer 12, and the reference orifice 25, may conveniently be mounted in a container 26, attached to the base 2. An opening is cut in the face of the container 26 which is closed by a screen 27 having a vertical slot 28 formed therein. A shutter 29 is slidably adjustable with respect to the slot 28, to define the lower edge of visibility of the slot 28. One arm of the U-shaped tube 12 may conveniently be bent forward so as to bring the tube directly in line with the slot 28.

Normally the shutter 29 is adjusted so that the fluid in the tubing 12 is just visible above the upper edge of the shutter 29. If the device being tested has a satisfactorily low leakage, the fluid in the tube 12 will remain stationary, or may possibly rise slightly. If the device being tested has a leakage greater than that of the reference orifice, the fluid in the tube will fall, thus indicating that the device is unsatisfactory.

While a particular type of differential pressure gauge, and cut-off cock, has been disclosed it is evident that other types of differential pressure gauges, and of cut-off cocks, may be substituted in the system and still come within the scope of the invention. It will thus be readily understood that the above-described arrangements are illustrative of one application of the principles of the invention. Numerous other arrangements may be devised by those skilled in the art without departure from the spirit and scope of the invention.

What is claimed is:

1. Apparatus for comparing the rate of leakage through a leaky receptacle with the rate of leakage through a reference orifice comprising a coupler having a resilient seat adapted to make a fluid tight connection with the leaky receptacle, a plunger having a resilient seat also adapted to make a fluid tight connection with the leaky receptacle, means to compress the air within said leaky receptacle in response to actuation of said plunger, a differential fluid pressure gauge having two input connections, a first conduit extending from one of the gauge connections to the space within said leaky receptacle via said coupling device, a second conduit extending from the other gauge connection to the space within said receptacle via said coupling device, a reference orifice in the second conduit, a cut-off cock intercalated in the second conduit between the coupler and the orifice, and a lever mechanism connected to the plunger and cock and adapted when operated to press the plunger on the receptacle to raise the pressure in the conduits and to operate said cut-off cock after the air within the receptacle has been compressed.

2. Apparatus for comparing the rate of leakage through a leaky receptacle with the rate of leakage through a reference orifice comprising a coupler body having a central cavity, two nipples inserted through said body and terminating in said cavity, a resilient seat surrounding said cavity and adapted to make a fluid tight connection with the leaky receptacle, a differential fluid pressure gauge having two input connections, a first conduit connecting one of the nipples to one of the gauge connections, a second conduit connecting the second nipple to the other gauge connection and having a reference orifice, a cut-off cock intercalated in the second conduit between the nipple and the orifice, a plunger having a resilient seat adapted to make a fluid tight connection with the leaky receptacle, and a lever mechanism connected to the plunger and cock and adapted when operated to press the plunger down on the receptacle to raise the pressure in the conduits and to operate said cut-off cock, and means for indicating a change in the reading of the fluid pressure gauge.

3. Apparatus for comparing the rate of leakage through a leaky receptacle with the rate of leakage through a reference orifice comprising a coupler having a resilient seat adapted to make a fluid tight connection with the leaky receptacle, a U-shaped transparent tube containing an opaque liquid, a shutter aligned with the normal level of said liquid, a first conduit extending from one arm of said tube to the space within said leaky receptacle via said coupling device, a second conduit extending from the other arm of said tube to the space within said receptacle via said coupling device, a reference orifice in said second conduit, a cut-off cock intercalated in the second conduit between the coupler and the orifice, a plunger also having a resilient seat adapted to make a fluid tight connection with the leaky receptacle, and a lever mechanism connected to the plunger and cock and adapted when operated to press the plunger on the receptacle to raise the pressure in the conduits and to operate said cut-off cock.

4. Apparatus for comparing the rate of leakage through a leaky receptacle with the rate of leakage through a reference orifice comprising a base, a coupler mounted on said base and having a resilient seat adapted to make a fluid tight connection with the leaky receptacle, a differential fluid pressure gauge having two connections, a first conduit extending from one of the gauge connections to the space within said leaky receptacle via said coupler, a T including an orifice having a desired rate of leakage, a second conduit connecting said T to the other connection of said gauge, a third resilient conduit extending from said T to the space within said leaky receptacle via said coupler, a support mounted on the base, a lever arm pivoted to the support, a plunger mounted on the lever arm having a resilient seat adapted to make a fluid tight connection with the leaky receptacle, means to compress the air within said leaky receptacle in response to actuation of said plunger, plunger means mounted on the base in contact with the resilient conduit, and a toggle mechanism connected to the lever arm and the plunger means and adapted when operated to press the plunger down on the receptacle and to press the plunger means down on the resilient conduit after the air within the receptacle has been compressed.

References Cited in the file of this patent
UNITED STATES PATENTS

| Number | Name | Date |
|---|---|---|
| 1,537,270 | Stabler et al. | May 12, 1925 |
| 1,589,825 | Staebler | June 22, 1926 |
| 1,684,014 | Dudley | Sept. 11, 1928 |
| 1,720,934 | Toleik | July 16, 1929 |
| 1,812,152 | Jensen | June 30, 1931 |
| 2,370,945 | Fields | Mar. 6, 1945 |
| 2,395,536 | Crawford et al. | Feb. 26, 1946 |
| 2,589,251 | Heinz | Mar. 18, 1952 |